Nov. 20, 1962  W. L. SANBORN  3,064,307
CONTINUOUS PROPORTIONAL BLENDER
Filed Oct. 25, 1956  7 Sheets-Sheet 1

Inventor
William L. Sanborn
By Mann, Brown & McWilliams
Attorneys Nov. 20, 1962  W. L. SANBORN  3,064,307
CONTINUOUS PROPORTIONAL BLENDER
Filed Oct. 25, 1956  7 Sheets-Sheet 2

Fig. 4

Inventor
William L. Sanborn
By Mann, Brown & McWilliams
Attorneys Nov. 20, 1962 W. L. SANBORN 3,064,307
CONTINUOUS PROPORTIONAL BLENDER
Filed Oct. 25, 1956 7 Sheets-Sheet 3

Inventor
William L. Sanborn
By Mann, Brown & McWilliams
Attorneys

Nov. 20, 1962 W. L. SANBORN 3,064,307
CONTINUOUS PROPORTIONAL BLENDER
Filed Oct. 25, 1956 7 Sheets-Sheet 4

Inventor
William L. Sanborn
By Mann, Brown & McWilliams
Attorneys

Nov. 20, 1962   W. L. SANBORN   3,064,307
CONTINUOUS PROPORTIONAL BLENDER
Filed Oct. 25, 1956   7 Sheets-Sheet 6

Inventor
William L. Sanborn
By Mann, Brown & McWilliams
Attorneys

3,064,307
CONTINUOUS PROPORTIONAL BLENDER
William L. Sanborn, Milwaukee, Wis., assignor to Bell &
Gossett Company, a corporation of Illinois
Filed Oct. 25, 1956, Ser. No. 618,278
6 Claims. (Cl. 18—2)

This invention relates to the proportional blending of substances and particularly to the blending of such substances in a uniform manner.

In industry there are many substances where two flowable substances must be blended in predetermined accurate proportions, and while many different types of blending equipment have heretofore been employed the automatic and continuous blending of substances in accurate proportions and with a complete and homogenous output has not been attained in respect to many substances which require such blending. One outstanding instance of this character is in the blending of synthetic rubber base material with the required accelerator. Such synthetic rubber base materials must be blended with the accelerator in predetermined proportions that are controlled within extremely fine limits, and the blending action must be complete so that there will be the desired uniformity in the final material. An example of such a material is Thiokol, that is made by Thiokol Corporation, and it is noted that while this material is said by some authorities to constitute a resin rather than a synthetic rubber, it nevertheless has the same general properties and its blending involves the same problems and therefore in the present disclosure, the term synthetic rubber is used in a broad sense that is intended to include Thiokol and other thioplasts as well as similar substances. With this particular material as with all synthetic rubbers, the base substance is relatively viscous and must be intimately mixed with an accelerator that has considerably less viscosity. This material is capable of being compounded so as to have uniformly determined characteristics and properties when the material has set up, and because of its resiliency, long life, and other desirable properties, has been used quite extensively as a caulking material in assembling airplane structures, household appliances such as refrigerators, and in various building operations where caulking is required.

Because of the necessity for accurate proportioning and blending of the ingredients of such synthetic rubber materials, it has been the usual practice to blend the materials in a manually performed batch operation. In such operation the ingredients were measured by weighing, and then after these materials were combined in a suitable container, the blending was performed manually by means of a suitable mixing tool such as a paddle or spatula. Such procedure has been considered objectionable from many different standpoints, one of which is that in the mixing operation considerable heat is developed. This heat accelerates the setting of the mixture so that as it is materially reduced the available time after mixing during which the material might be handled and used.

Under prior practice it has been customary to retard the setting action after completion of the manually performed blending operation by loading the mixture into small containers such as the supply cylinder used in caulking guns, and then freezing the mixture in these containers so that they might be stored until needed for use. Then, when the material was to be used, it was thawed and thereafter extruded from a caulking gun into its final position of use.

The foregoing operations that have been required in the use of synthetic rubber materials have been considered objectionable because of the time and labor required in not only weighing, mixing and packing operations, but in the freezing and thawing operations that were involved. Moreover, the heat produced in the mixing operations has reduced the available setting time to such an extent as to be troublesome in many uses of the material.

Another objectionable characteristic of the prior practice has been found in the time and labor required for thoroughly cleaning the mixing equipment and the containers in which the measuring, weighing and packaging operations were performed.

In view of the foregoing, it is an important object of the present invention to enable materials to be accurately and continuously blended at a predetermined rate so that the rate of production of the blended final product may be coordinated with the rate of use, thus to minimize the loss of setting time that has heretofore been experienced in respect particularly to synthetic rubber products. A further and related object is to enable the mixing or blending of the ingredients to be performed in such a way that the production of heat in the material is minimized, thus to enable the maximum of the available setting time to be rendered available.

As above pointed out the cleaning of the equipment heretofore utilized in mixing and blending synthetic rubber material has constituted an objectionable item of trouble and cost, and another important object of the present invention is to enable substances of this character to be blended in such a way that the need for manual cleaning of the involved apparatus is for all practical purposes eliminated.

In the prior practice utilized in blending synthetic rubber materials the requisite accuracy of proportioning of the base material and the accelerator has been attained by weighing the material introduced into each batch. Reliance on weighing as a means of determining the amounts to be mixed together is of course a time consuming operation, and another object of the present invention is to enable materials of this character to be volumetrically metered or measured to attain the desired proportioning in the final mixture.

The base material utilized in synthetic rubber is of such a character that there is a tendency to trap air in the body of the material, and this is found to be particularly troublesome in those instances where the material is being transferred from one container to another. Removal of entrapped air is important in enabling minimum size supply tanks to be used, to enable volumetric metering to be employed, and in assuring uniformity in the product and in its setting and adhesive properties. Such material is usually furnished in small cans or drums, and in order that it may be handled in a volumetric metering system it is necessary to transfer base material from the original drum into some form of continuous feeding mechanism. It is in such transfer that the most serious entrapment of air is encountered, although it is found that even in the original packing of the base material there may be considerable air trapped in the product, and it has been found that there is normally a considerable variation in the amount of air that is thus entrapped.

In the apparatus disclosed herein simple and effective means are provided for eliminating entrapped air from the material during the time the material is being introduced into the supply container of a blending machine.

Where viscous materials are to be proportioned in the manner described hereabove I have found it possible to accomplish this proportional by feeding each of the ingredients from its supply tank to an individual positive displacement pump, and by driving such pumps in a predetermined relationship to each other, and relating the outputs of the pumps to each other in a predetermined proportional manner, the desired proportional relation may be accomplished. In such pumping of the material however, it is essential that the proportioning pump that is utilized operate without undue stress upon parts thereof so as to assure continued satisfactory operation of the pump. One situation of this character is encountered where there is a tendency of the pump to have a locked condition when the pump is passing from its suction stroke to its pressure stroke. In the apparatus disclosed herein a proportioning pump is shown wherein the connection of the cylinder to the outlet port takes place at precisely the time when the piston starts on its pressure or pumping stroke so as to prevent locking and wherein the inlet and outlet ports are completely isolated from each other at all times so as to prevent leakage of the material in a reverse direction.

Other and further objects of the present invention will be apparent from the following description and claims, and are illustrated in the accompanying drawings, which by way of illustration, show a preferred embodiment of the present invention and the principles thereof, and what is now considered to be the best mode in which to apply these principles. Other embodiments of the invention embodying the same or equivalent principles may be used and structural changes may be made as desired by those skilled in the art without parting from the invention.

For purposes of disclosure, the invention is herein illustrated as embodied in a continuous proportional blending machine 30 that has an upstanding rectangular cabinet 31, and on and within this cabinet the means are mounted for continuous proportional blending of ingredients that are to make up a desired final product. The present machine 30 is particularly designed and adapted for blending the ingredients of a resilient caulking material, but it must be recognized that the apparatus of the present invention may be utilized for continuously blending substances or ingredients that are required to produce other kinds and types of final product. More particularly, the present machine 30 is designed for continuous proportional blending of the ingredients that are employed in making up a synthetic rubber, and these ingredients in a general way consist of a relatively viscous base ingredient and a less viscous accelerator. These ingredients, in order to produce a final product having the desired characters, must be blended uniformly in a predetermined proportion, and this proportioning must be controlled within extremely accurate limits. In the blending operation in respect to materials of this character, it is essential that the blending be accomplished without the creation of excessive heat because such heat tends to materially accelerate the setting of the product so as to reduce the working time that is available in the application or use of the product.

*General Organization*

The ingredients to be used in carrying out the desired continuous proportional blending operation are contained in a pair of supply tanks 33 and 34 that are mounted on and outside of the rear wall of the base or cabinet 31, and in the present instance the supply tank 33 is relatively large and is intended to contain a supply of the base ingredient, while the tank 34 is considerably smaller and is utilized to hold a supply of the accelerator ingredient. The two ingredients, under the present invention, are maintained under a relatively high feeding air pressure within the supply tanks 33 and 34, and are fed respectively to a pair of positive displacing metering pumps 35 and 36 that are in the present instance driven at the same speed by a speed reducer 37. The speed reducer 37 is directly driven from a motor 38, and it might be pointed out that the two metering pumps 35 and 36, the speed reducer 37 and the motor 38 are mounted within the base 31 on a supporting shelf 39.

The outputs of the two metering pumps 35 and 36 are related one to the other so that the two ingredients will be fed in the proportion that is required, and the output lines from the respective metering pumps are arranged to feed the ingredients to a blender 40 as will be described hereafter so that the materials are continuously blended within the blender 40 and are discharged therefrom through an axial outlet 41.

As herein shown the blender 40 is supported on the forward face of an upright rigid column 42 that extends upwardly from within the base 31 near the rear wall of the base. The blender 40, as will hereinafter be described in some detail, includes an internal rotor 140, FIGS. 18, 19, 20 and 21, and this rotor 140 is driven from a motor 43 located within the base 31. The output shaft of the motor 43 is connected by a speed reducing belt and pulley drive 44 to the rotor 140, such belt and pulley drive terminating in a pulley 44P that drives a shaft 44 that is mounted horizontally on the column 42. The shaft 44 drives the rotor at 140 as will be described in detail hereinafter.

Figures 1, 2, 3:
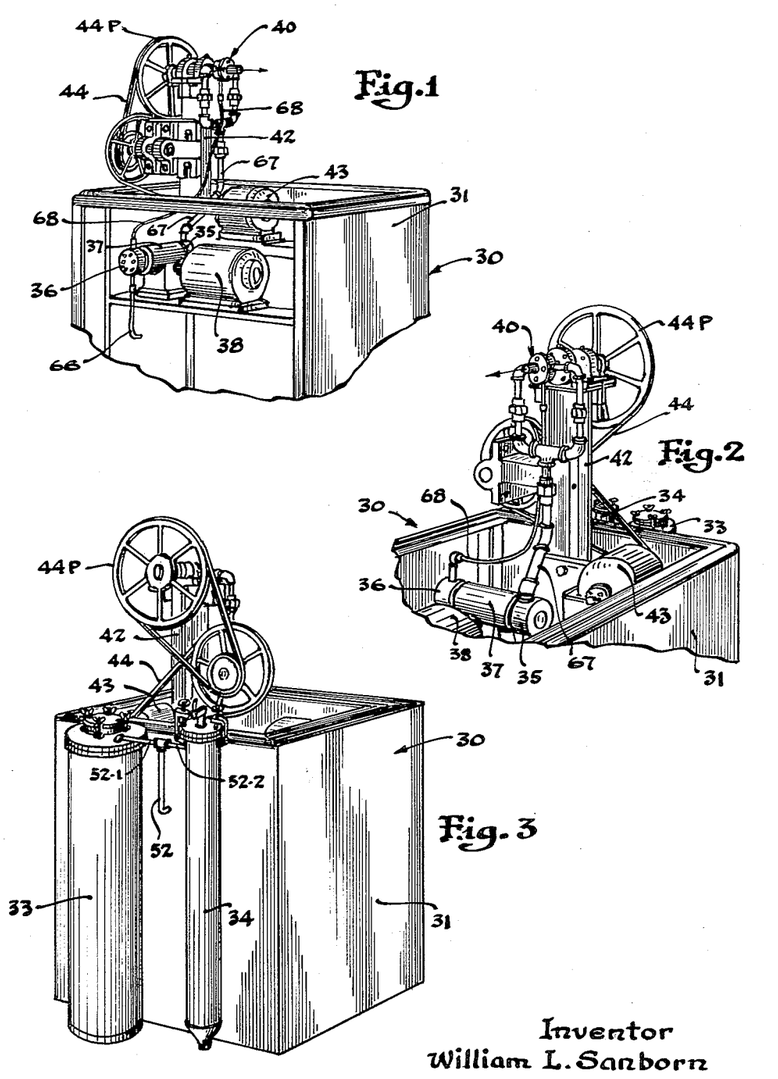
FIG. 1 is a fragmentary front perspective view of a continuous blending machine embodying the features of invention.
FIG. 2 is a fragmentary front perspective view of the machine taken from a different angle.
FIG. 3 is a rear perspective view of the machine.
Figure 4:
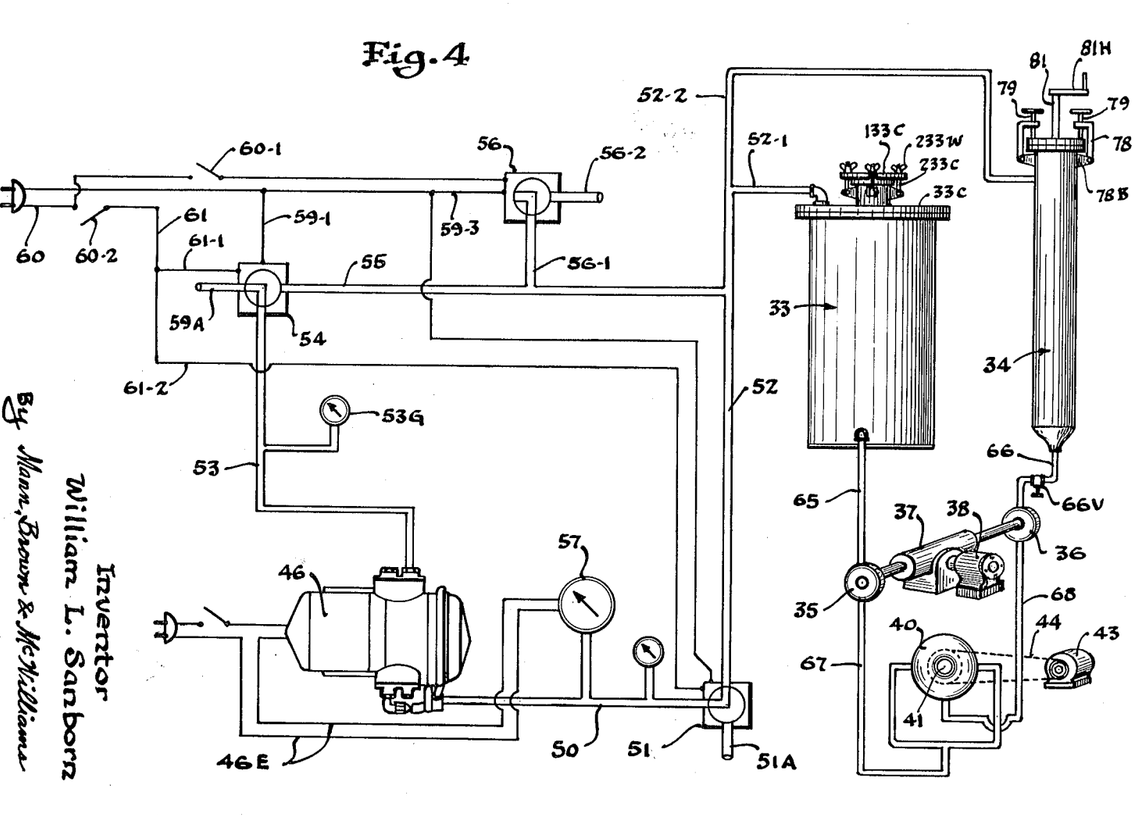
FIG. 4 is a schematic view illustrating the loading supply, proportioning and blending mechanisms of the machine.

The base 31 also houses an air compressor 46 driven by a built in motor and these elements are shown diagrammatically in FIG. 4 of the drawings, and where the machine is to be used in blending materials that are adversely affected by the presence of oil, the compressor 46 should be of the oilless type. The compressor 46 is utilized primarily to provide the desired feeding pressure within the supply tanks 33 and 34, but where one or more of the ingredients to be blended is of the type that tends to trap air during the tank-filling operation, the compressor 46 is also utilized as a vacuum pump to remove such air during the filling operation and prior to this blending operation. In FIG. 4 of the drawing the compressor 46 is shown diagrammatically in association with the other elements of the apparatus for functioning not only as a compressor during the blending cycle, but, also as a vacuum pump during the filling operation.

*The Material Loading and Feeding System*

In providing for use of the compressor 45 as either a pressure or vacuum source, the pressure side of the compressor is connected by a pipe 50 to one port of a three-way solenoid operated valve 51 that is normally in such a set position as to connect the pipe 50 with a pipe 52, and this pipe has a branch 52–1 that is connected to the upper portion of the base compound supply tank 33. Another branch 52–2 is extended to the upper portion of the accelerator supply tank 34. The solenoid valve 51 has its third port connected to a stub pipe 51A and when the valve 51 is energized, it is shifted so as to connect the pipe 50 to the stub pipe 51A, thus to enable the output of the compressor to be discharged to atmosphere when the compressor is being used as a vacuum source.

The suction side of the compressor 46 is connected by a pipe 53 to one port of a solenoid operated 3-way valve 54 that is normally in such a set position that it connects pipe 53 with a stub pipe 54A, and thus in the normal setting of the valve 54, the suction side of the compressor 46 is connected to atmosphere. The other port of the 3-way valve 54 is connected by pipe 55 to the pipe 52, and when the solenoid valve 54 is energized, the pipes 53 and 55 are connected so that the compressor will withdraw air from the two tanks 33 and 34 and create a vacuum condition therein. Actually this vacuum condition is required only in respect to the base compound tank 33, but since a vacuum condition will, under the circumstances, cause no harm in the accelerator tank 34, this arrangement has been adopted in the interests of simplicity.

When the system is to be changed over from a blending to a filling condition, it is necessary to vent the pressure air from the two tanks 33 and 34, and this is accomplished by a 2-way solenoid operated valve 56 having one port connected by a pipe 56–1 to the pipe 55, and having its other port connected to a short vent pipe 56–2. The solenoid operated valve 56 is normally in such a set position that the two pipes 56–1 and 56–2 are isolated one from the other, but when the pressure is to be vented, the valve 56 is energized to interconnect these two pipes and allow the pressure air to drain off to atmosphere.

The operation of the compressor 46 is controlled by a pressure switch 57 that is connected to the pipe 50 so as to be responsive to the pressure in this pipe, and the switch of this unit is connected in the electrical operating circuit 46E of the compressor as shown in FIG. 4.

In providing for operation of these solenoid operated valves, a common lead 59 has branches 59–1, 59–2 and 59–3 extended respectively to one terminal of the solenoid valves 54, 51 and 56. When the system is to be changed over from a blending condition to a filling condition, the solenoid valve 56 is first energized so as to be opened for a period sufficient to release the pressure air from the tanks 33 and 34. This is accomplished by connecting the other lead 60 of the electrical circuit through a normally open switch 60–1 to the other terminal of the valves 56. After the pressure has been exhausted from the tank the switch 60–1 is opened, so as to cause the valve 56 to assume its normal or closed position.

The solenoid valves 51 and 54 are then operated to reverse these valves, and this is accomplished by connecting or closing a switch 60–2 so as to connect the line wire 60 to a wire 61 and branch leads 61–1 and 61–2 that are extended respectively to the other terminals of the solenoid valves 54 and 51. The compressor 46 then operates as a vacuum source to exhaust the air from the two tanks and create a vacuum condition therein.

While the feeding, metering and blending of the two substances from the tanks 33 and 34 will be described in some detail hereinafter, it might be pointed out that the base compound is fed from the bottom of the tank 33 through a feed line 65 to the inlet side of the metering pump 35, while the accelerator material is fed from the bottom of the tank 34 through a line 66 to the inlet side of the metering pump 36.

The metered output of the pump 35 is fed through a line 67 and a pair of branch lines 67L and 67R to opposite sides of the inlet end of the blender 40. The output of the metering pump 36 is fed through a line 68 to the inlet end of the blender 40 so that the accelerator material is fed into the blender at a point midway between the two points where the base compound material enters the blender.

*The Tank 33 for the Base Compound*

Figures 5, 5A, 6, 7, 7A, 8, 9:
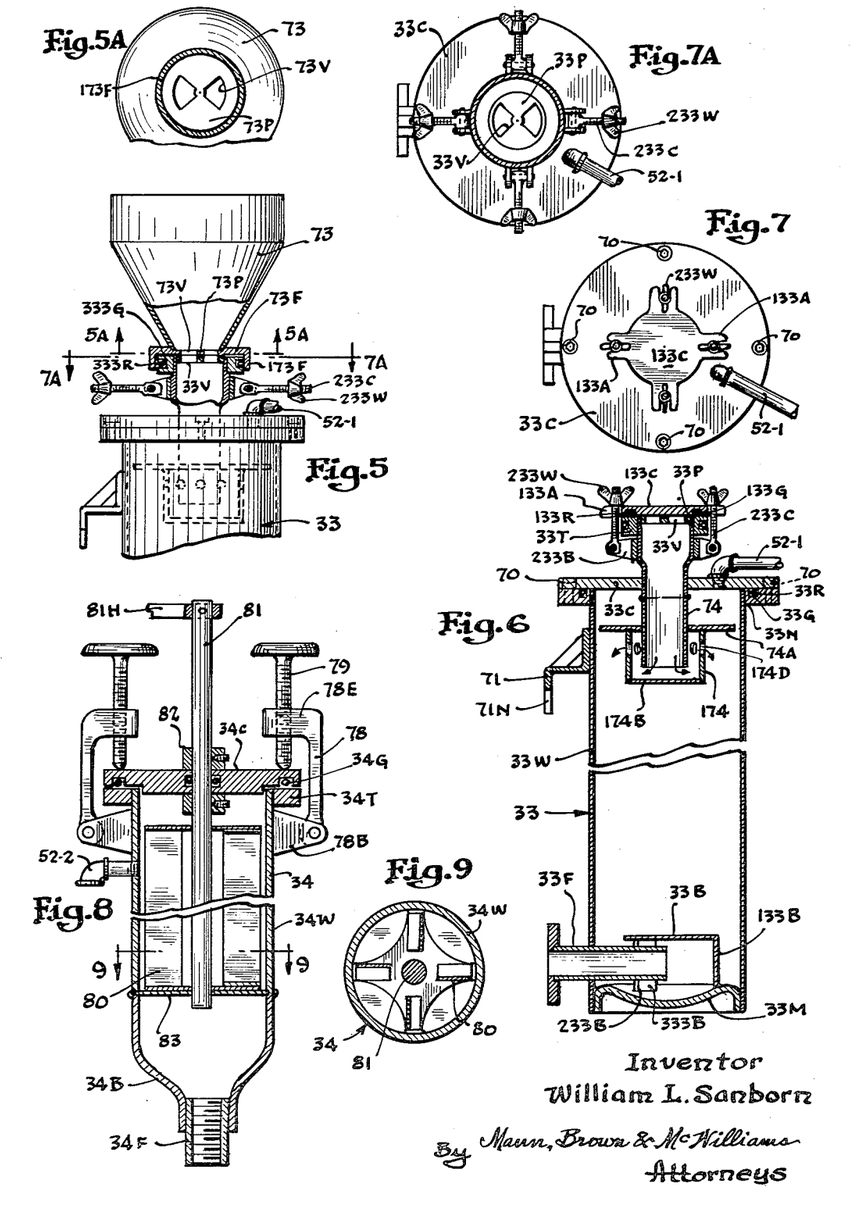
FIG. 5 is a fragmentary view illustrating one of the supply tanks arranged in condition for loading of the tank with one of the ingredients that is to be used in the blending operation.
FIG. 5A is a plan view of the funnel illustrating the portion of the valve or shutoff means that is incorporated in the funnel.
FIG. 6 is a fragmentary vertical sectional view of the supply tank that is used for the most viscous material.
FIG. 7 is a plan view of the top of the tank showing the form of the cover and the cover clamping means.
FIG. 7A is a plan view similar to FIG. 7 and showing portion of the valve or shutoff means that is incorporated in the upper end of the tank.
FIG. 8 is a vertical sectional view through the supply tank that is utilized for the less viscous ingredients that is to be employed in the blending operation.
FIG. 9 is a transverse cross section taken substantially along the line 9—9 of FIG. 8.

The base compound tank 33 is shown in vertical cross section in FIG. 6 of the drawings and comprises a main cylindrical wall 33W having a bottom wall or closure wall 33M secured therein as by welding. The tank at its lower end has a horizontal outlet pipe fitting 33F secured therein so as to extend through the side wall 33W, and within the tank this fitting 33F extends substantially to the center line of the tank. About the inner end of the outlet fitting 33F baffle means are provided so as to prevent what may be termed a blow-through of the pressure air. Such baffle means in the present instance comprises a horizontal plate 33B that overlies the inner end of the fitting 33F and extends for a substantial distance toward the side wall 33W. A down-turned portion 133B of this plate extends to the bottom wall 33B and is welded thereto at a point opposite and spaced substantially from the open inner end of fitting 33F. In addition to the foregoing, a flanged wall 233B is positioned about the inlet fitting 33F at a point spaced from the inlet end thereof, and the wall 233B is spaced slightly from the bottom wall 33M and engages the lower face of the baffle 33B. Flanges 333B on the opposite ends of the wall 233B are welded to the baffle 33B and to the bottom wall, thus to serve not only as baffle means but, also in supporting the member 33B. The material must, therefore, flow along a somewhat tortuous path to enter the discharge fitting 33F and this eliminates the possibility of a direct air path being established from the top of the tank through the material to the fitting 33F.

At its upper end the wall 33W has outwardly extending flange 33N rigidly secured thereto as by welding, and in its upper surface the flange 33N has a groove 33G formed therein to receive a sealing means such as an O ring 33R. The top of the tank 33 is closed by heavy cover 33C that is removably secured in position to flange 33N by a plurality of cap screws 70. The cover 33C may of course be removed when the tank 33 is to be cleaned or inspected. The tank 33 is arranged to be supported on the outer rear face of cabinet 31 by means of a hanger bracket 71 that is notched at 71N to engage suitable supporting means on the cabinet, and the length of the fitting 33F is coordinated with the dimensions of the bracket 71 so that this fitting may rest against the outer surface of the cabinet.

The cover 33C is arranged under the present invention to carry means that are important in loading highly viscous material to the tank 33, and in the loading of the tank such means cooperate with the vacuum condition that is created in the tank to remove any entrapped air in the material as such material is deposited in the supply tank 33. In the loading operation, use is made of a funnel 73 as will be described in some detail hereinafter, and the aforesaid means that are carried by cover 33C are arranged to cooperate with such funnel in the loading operation. Thus the portion of the loading means that are incorporated in or on the cover 33C comprise an axial filling pipe 74 extended through the cover 33C and secured therein as by welding. At its upper end, where the pipe 74 projects upwardly from the cover 33C, outwardly extending flange 33T of substantial cross section is secured to the pipe 74, and across the upper end of the pipe and within the upper portions of the flange 33T, a valve plate 33P is secured as by welding. This valve plate 33P has a pair of diametrically disposed valve openings 33V formed therein, these openings being segmental in character as will be evident in FIG. 7A of the drawings.

When the upper end of the pipe 74 is to be closed, a cover plate 133C is put in position on top of the pipe, this cover being upwardly recessed in the area opposite plate 33P so that the bordering areas of the plate 133C will bear against the upper surface of the flange 33T. In this bordering area of the lower face of the plate 133C an annular groove 133G is formed to receive an O ring 133R or other suitable sealing means. The plate 133C is clamped downwardly to effect the desired seal, and in the present instance this is accomplished by means of four equally spaced clamping screws 233C. These clamp screws 233C are pivotally mounted at their lower ends in extending arms of a mounting bracket 233B that is secured by welding to the outer surface of the pipe 74 just below the top flange 33T. The clamping screws 233C are arranged to be pivoted from the released positions of FIG. 5 to upright positions wherein they extend through slots in outward clamping arms 133A at the top plate 133C. Wing nuts 233W on the several screws may then be tightened to effect the necessary clamping of the top plate 133C.

Within the tank 33, the lower end of the filling pipe 74 has means associated therewith to form what amounts to a trap so that the direction of advancing movement of the material that is being loaded is changed or reversed as it progresses into the tank 33. In the present instance, this trap structure is provided by fixing a transverse, ring-like plate 74A to the pipe 74 at a position spaced substantially upwardly of the pipe 74. The edges of the plate 74A are spaced from the side walls 33W to provide for free communication between upper and lower portions of the tanks. A relatively large diameter pipe 174 of comparatively short length is welded to the lower surface of plate 74A in concentric relationship to pipe 74 and this short pipe 174 extends downwardly to a point somewhat below the lower end of the pipe 74. The lower end of the pipe 174 is closed by a cross wall 174B. Near its upper end, and substantially above the lower end of the pipe 74, the pipe 174 has a plurality of discharge openings 174D formed therein. Thus when the material flows downwardly through the pipe 74, it must reverse its movement as indicated by the arrow in FIG. 6 and flow upwardly to the discharge openings 174D from which the material is discharged in a generally horizontal direction so that it may fall downwardly to the bottom of the tank 33. This structure therefore serves as a trap, and this trap structure, of course, may readily be removed when the top cover 33C is removed.

When the tank 33 is to be filled, the clamping screws are released and the cap 133C is removed. The filling funnel 73 is then put into position, and it will be noted that the funnel 73 is arranged to have a relatively tight seal in respect to the upper end of the filling pipe 74. Thus, the lower end of the funnel 73 has a lower end fitting 73F secured thereto as by welding and this fitting includes a cross wall 73P in which a pair of segmental valve openings 73V are formed for cooperation with the valve openings 33V as will be described. At its outer portions, the bottom fitting 73F has a downwardly projecting flange 173F that is adapted to snugly embrace the outer edge surface of top flange 33T, and to produce an effective seal between flange 173F and the top flange 33T of the filler pipe, the flange 33T has an outwardly facing annular groove 333G formed therein to receive a compressible sealing means such as an O ring 333R. Hence, when the funnel is put into position, an effectual sealing is provided about the edges of the connection, and by rotation of the funnel 73 about its vertical axis, the plates 73P and 33P are caused to act as a valve so that the filling opening may be completely closed. This is important in order to control the rate of flow of the material, particularly where the materials of different viscosities are to be handled, and it is also important to prevent flow of the material before a proper degree of vacuum has been established within the tanks 33. Thus, in the usual filling operation the filling opening is closed by rotation of the funnel 73, and the compressor 46 is operated as a vacuum pump until a vacuum of the order of 20 inches of mercury has been established in the tank 33. The vacuum measurement is provided on suitable gauge means that are herein shown as comprising a compound gauge 53G connected to the line 53. A compound gauge is preferably employed so that the gauge will not be injured in the event a workman reverses the connections before all of the pressure air has been discharged or vented from the tanks 33 and 34.

When the filling of the tank 33 has been completed the funnel 73 is removed and the cap 133C is put in place.

*The Tank 34 for the Accelerator*

The accelerator tank 34 is shown in detail in FIGS. 8 and 9 of the drawings and comprises a cylindrical wall 34W that has a tapered lower end 34B in which a nipple or fitting 34F is secured so that the feed line 66 may be readily connected thereto. At its upper end the wall 34W has an outwardly extended flange 34T that is utilized in removably clamping a top or cover 34C in place so as to close the tank 34. The lower face of the cover 34C has an annular downwardly facing groove 34G formed therein and a gasket in the form of an O ring located in the groove 34G is arranged to bear against the upper surface of the top flange 34T. A plurality of clamp arms 78 are pivoted by brackets 78B on the tank 34, and these arms 78 are adapted to be swung upwardly so that inturned upper ends 78E overlie the edges of the cover 34C. This positions screw devices 79 carried in the clamp members 78 in locations such that they may then be tightened downwardly against the border portions of the cover and hold the same in place and seal the upper end of the tank 34.

The accelerator that is used in many instances, tends to stratify when the machine is not in use, means are therefore provided in association with tank 34 whereby the accelerator may be mixed when this is required. In the present instance, such means are afforded by a four bladed paddle wheel 80 that is carried on a vertical shaft 81. This shaft 81 extends downwardly through the cover 34C through top bearings 82, and has its lower end extended beyond the paddle wheel 80 so that it may project through an opening in a transverse bearing bar 83. The mixing means in the present instance are adapted for manual operation and for this purpose a handle 81H is provided on the outer or upper end of the shaft 81.

The Metering Pumps

The metering pumps 35 and 36 are of identical construction except for the size or capacity, and because of such identity, specific description thereof will be confined to the metering pump 36 which is shown in detail in FIGS. 10 to 16 of the drawings.

Figure 10:
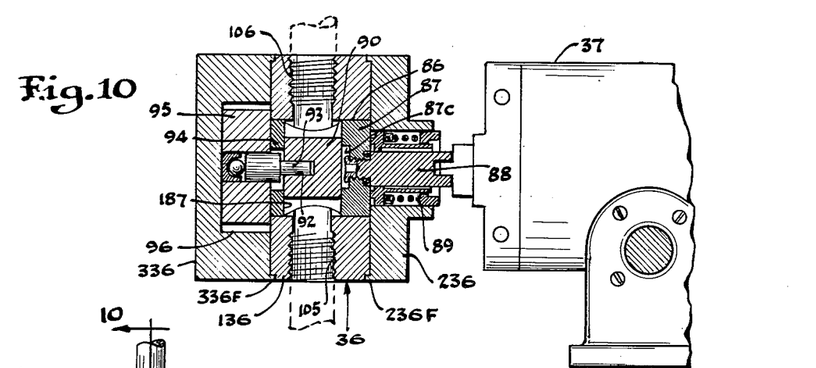
FIG. 10 is a view taken partially in section along the line 10—10 of FIG. 11 and illustrating one of the metering pumps that is employed in proportionally feeding the ingredients that are to be blended.

The pump 36 comprises a sectional casing that is generally cylindrical in form and comprises a central section 136, an end bearing section 236 located at one end of and in axial alignment with the central section, and an end closure section 336 that is disposed at the other end of the central section 136. The three sections are held in place in an endwise sense by plurality of cap screws 85, while annular flanges 236F and 336F on the respective end sections engage complemental rabbeted annular grooves at the ends of the center section 136 to accurately maintain the three casing sections in axial alignment.

The center section 136 is formed with an axial bore 86 therein to rotatably receive a cylindrical rotor 87, there this rotor is driven by a stub shaft 88 that extends axially through the casing section 236 in which it is rotatably supported by a combined bearing and packing unit 89 which affords effective rotary seal between the shaft 88 and the casing section 236. At its inner end the stub shaft 88 is threaded through the rotor 87 axially thereof and this threaded association of the shaft 88 and the rotor is preferably rendered permanent by riveting the threaded end of the shaft 88 in an internal clearance space 87C. Within the rotor 87, a diametric bore 187 is formed to receive and serve as a cylinder for a reciprocable piston 90, and it is within the cylinder or bore 187 that the clearance space 87C is formed.

The piston 90 is reciprocated within the bore 187 as an incident to the rotation of the rotor 87, and this is accomplished by holding the piston 90 in an eccentric relation with respect to the rotative axis of the rotor 87. The piston-control means that thus establish the eccentricity of the piston with respect to the rotative axis of the rotor serve also to determine the effective stroke of the piston, thus, to establish the pumping or metering rate for any particular piston and cylinder diameter, and such eccentricity may be adjusted to vary the pump output. Thus the means for controlling the eccentricity of the pump includes a transverse slot 92 formed in one side of the piston 90 midway between its ends, and it also includes a pin 93 that is mounted in the closure section 336 of the pump casing and which engages the transverse slot 92 of the piston. The pin 93 extends through a clearance opening 94 formed in the rotor 87 at the end that is adjacent to the closure section 336 of the casing.

The pin 93 is carried in a carrier block 95 that is disposed within a relative large clearance bore 96 that is formed in the casing section 336 so as to open toward the central casing section 136. The mounting block 95 is generally cylindrical in form and has a diameter substantially less than the diameter of the clearance bore 96 so that the mounting block 95 may be adjusted to vary the eccentricity of the pin 93. As shown in FIGS. 10 to 13, the pin 93 has an enlarged end extending through a central bore 95B in the block 95, and within the bore 95B, a thrust bearing ball 195B is mounted in a carrier 195C so that the carrier bears against the bottom of the bore 96 and positions the ball 195B so that the adjacent end of the pin 93 bears against the ball. This provides a bearing that allows the pin 93 to rotate as such rotation may be induced for the forces acting by the pin and sides of the slot 92.

Figure 11:
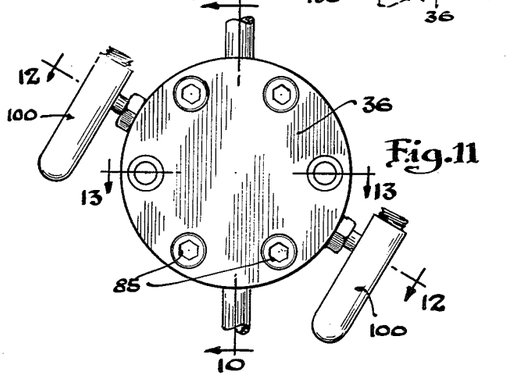
FIG. 11 is a left-hand end view of the metering pump illustrated in FIG. 10.
Figure 12:
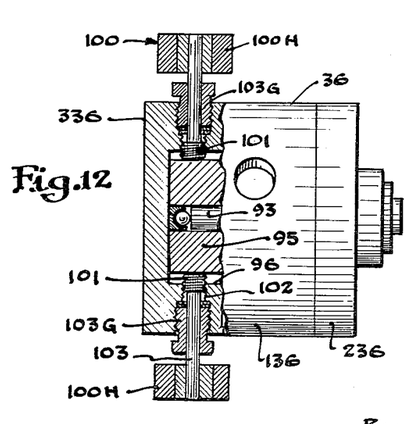
FIG. 12 is a partial sectional view taken substantially along the line 12—12 of FIG. 11 and illustrating the structure of the adjusting means of the metering pump.
Figure 13:
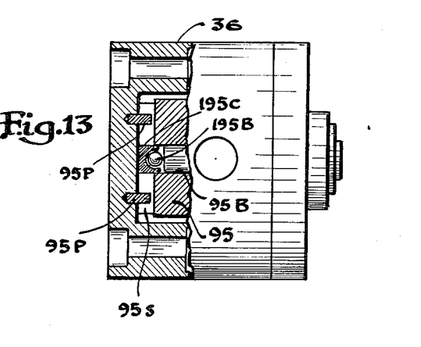
FIG. 13 is a sectional view taken substantially along the line 13—13 of FIG. 11 and illustrating the manner in which the parts of the pump casing are associated.
Figure 13A:
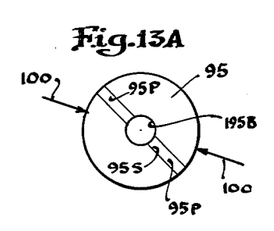
FIG. 13A is a schematic perspective view of the stroke adjusting means of one of the metering pumps.

It has been pointed out hereinabove that the mounting block 95 is arranged for adjustment, and such adjustment must be along a line prependicular to the central axis of the inlet and outlet ports of the pump as will be described in some detail hereinafter. To this end the rear or left hand face of the mounting block 95 is formed with a diametric slot 95S therein as will be evident particularly in FIGS. 13 and 13A, and a pair of stationary pins 95P are mounted within the bore 96 on opposite sides of the pump rotor 87. Thus the mounting block 95 is guided along a line of adjusting movement that corresponds with the line 13—13 that is shown in FIG. 11.

The desired adjustment of the block 95 to attain a particular variation in the output of the metering pump is attained by adjusting the block 95 along the line of adjustment that is determined by the pins 95P and the slot 95S. As will be evident in FIGS. 11 and 12, such adjustment is provided by a pair of similar adjusting units 100 that are arranged to apply the adjusting forces along the line 12—12 of FIG. 11, which it will be noted, is displaced slightly in an angular sense from the actual line of adjustment of the block 95. This is required because it is desired to avoid applying the adjusting forces directly at the ends of the guide slot 95S. Each adjusting device comprises a screw 101 threaded through a bore 102 and engaging the adjacent surface of the block 95, and each screw is operated by an integral outwardly extending rod 103 upon the outer end of which an operating handle 100H is secured. The rod 103 in each instance passes through a sealing gland 103G and is rotatable therein for applying the necessary adjusting movement due to adjusting screws 101.

As mentioned hereinabove, the line of adjustment of the block 95 and the control pin 93 must be located at right angles to the central axis to the inlet and outlet ports of the pump, and in providing for such ports, the central section 136 of the pump has a threaded inlet opening 105 and threaded outlet opening 106 disposed on a common diametric axis perpendicular to the line of adjustment of the control pin 93, and these threaded openings are adapted to receive the inlet and outlet connections that are to be provided for the pump. At their inner ends the inlet and outlet passages are enlarged by internally recessing the bore 86 to provide an inlet port 107 and an outlet port 108. When viewed in transverse cross section, as in FIGS. 14 to 16, these inlet and outlet ports 107 and 108 are herein shown as being of crescent shape, but such shape is merely a convenience so that these ports may be formed by a milling operation. So far as the present invention is concerned these ports might take different shapes, and the important aspect of these ports is their relative size and proportioning in a circumferential sense with respect to the diameter of the cylinder and piston. This importance is by reason of accuracy of valving action that is essential to effective isolation of the inlet and outlet ports while at the same time preventing locking of the material within the cylinder after a discharge stroke of the piston has started. This important relationship of the ports has been illustrated in a diagrammatic manner in FIGS. 14 to 16 of the drawings.

Figures 14, 15, 16:
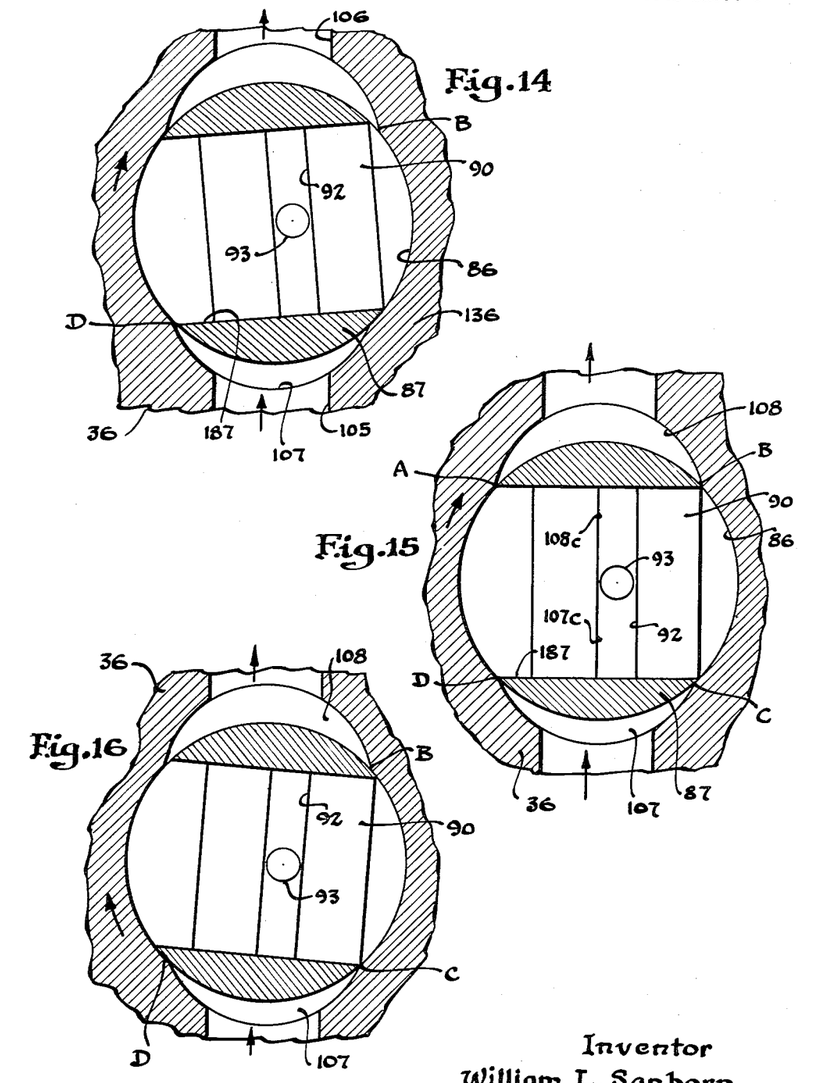
FIGS. 14, 15 and 16 are diagrammatic views illustrating the relationship of the parts of the metering pump.

The relationship of the ports to the cylinder and the piston movements may best be understood by first considering the relationship of these parts when the pump is at what may be termed its "dead center" position wherein the piston 90 is at one end of its pumping stroke, and such a relationship is shown in FIG. 15 of the drawings. Thus, in FIG. 15 it will be observed that the circumferential extent of the inlet port 107 is substantially less than the shortest circumferential distance between the opposite ends of the cylinder 187, and this causes a substantial circumferential overlap of the rotor at points C and D when the rotor 87, is in its "dead center" position. This substantial overlap affords a seal that effectually isolates the inlet port 107 from the outlet port 108 at this point in the pump operation.

The outlet port 108, however, bears a different relationship to the rotor 87 and the cylinder 187 in that the circumferential extent of the outlet port 108 is somewhat greater than that of the inlet port 107, and as will be evident in FIG. 15, the outlet port 108 has a circumferential length that is just slightly less than the smallest circumferential distance between the opposite ends of the cylinder 187. Thus, when the rotor 87 is in its "dead center" position, there is an extremely small overlap of the opposite ends of the outlet port 108, by the rotor 87 such overlap being indicated at points A and B in FIG. 15 of the drawings.

The difference in the effective circumferential lengths of the inlet and outlet ports 107 and 108 may be conveniently obtained by using the same milling cutter to form such ports while varying the eccentricity of the milling cutter with respect to the axis of the bore 86. Thus, the inlet port 107 is shown as being formed by continuing the operation of the milling cutter down to a center 107C, as shown in FIG. 15, while the outlet port 108 is shown as being formed by continuing the operation of the milling cutter to a somewhat greater depth where the axis of such cutter is located at a center 108C.

To further explain the advantageous non-locking action that is attained when the ports are thus proportioned, it will be assumed that the rotor is operating in a clockwise direction as indicated by the arrow in FIG. 15 and that the left hand end of the cylinder 187 is completely filled with the material that is being metered so as to be ready for discharge to the outlet port 108 upon continued rotation of the rotor 87. Thus, as such rotation continues, the parts move to the relationship shown in FIG. 16, and because of the very slight overlap at point A in FIG. 15, such continued rotation almost immediately opens the trailing edge of the outlet port 108 as will be evident in FIG. 16. This early or almost immediate opening of the outlet port 108 to the left hand end of the cylinder 187 takes place during a time period when the reciprocating or return movement of the piston 90 is negligible, so that when the rate of movement of the piston 90 increases, the outlet port 108 is properly connected with the left end of the cylinder and the contents of the cylinder may be discharged without objectionable locking.

As the left hand end of the cylinder has been thus connected with the outlet port 108, the seal or sealing area at the point D has been substantially increased as will be evident in FIG. 16, and there has been a corresponding increase of the sealing area at the point B.

In a position of the parts shown in FIG. 16 the seal at the point C between the inlet port 107 and the right hand end of the cylinder 187 has been maintained and it is only after the rotation of the rotor 87 has progressed further that the inlet port 107 is effectually connected to the right hand end of the cylinder 187. At the same time, the sealing area at the point B will have further increased so that effective isolation of the inlet and outlet ports has been assured.

As the rotation of the rotor 87 progressses, the intake or right hand end of the cylinder 187 as shown in FIG. 16, is filled and reaches the left hand position or relationship shown in FIG. 14 of the drawings, and because of the smaller circumferential length of the inlet port 107, the inlet port is sealed at point D before rotor 87 reaches its "dead center" position of FIG. 15. It is important to note in this respect, however, that as shown in FIG. 14, the outlet port 108 is not sealed with respect to the discharging or right hand end of the cylinder 87 until almost exactly the time when the piston reaches its "dead center" position of FIG. 15, and thus completion of the discharging action is assured.

*The Blender 40*

Figures 17, 18, 19:
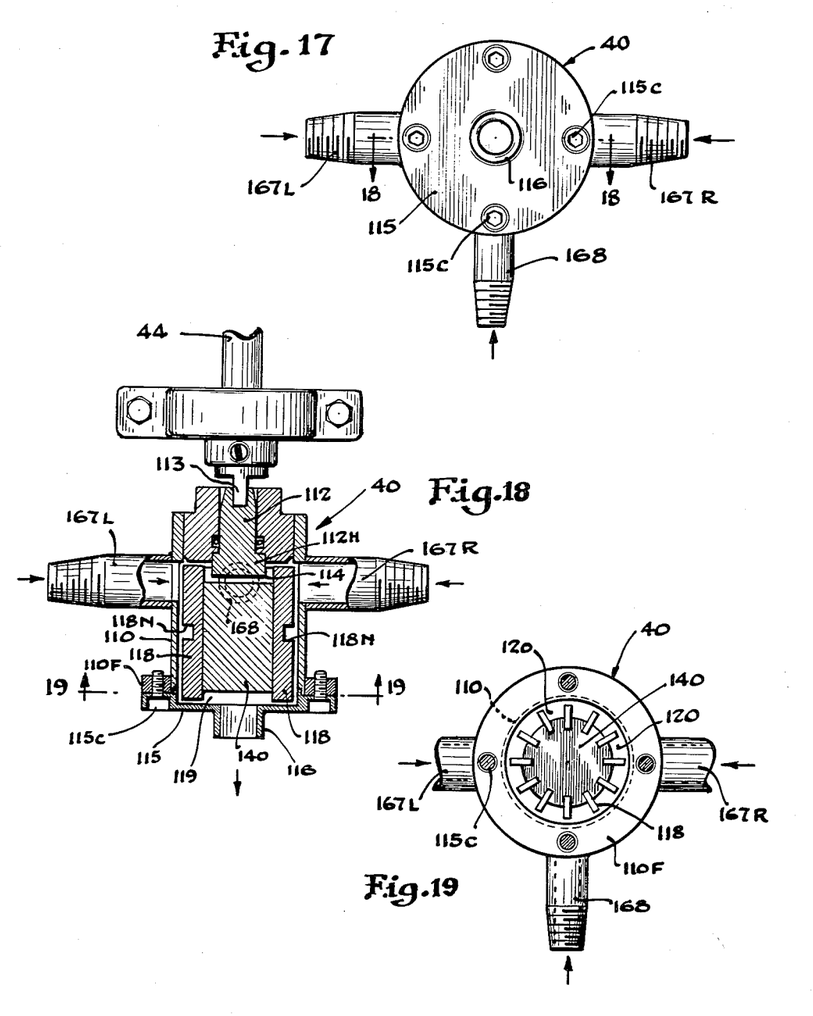
FIG. 17 is a front elevation view of the blending unit.
FIG. 18 is a horizontal sectional view of the blending unit taken substantially along the line 18—18 of FIG. 17.
FIG. 19 is a transverse sectional view of the blending unit taken substantially along the line 19—19 of FIG. 18.
Figure 20:
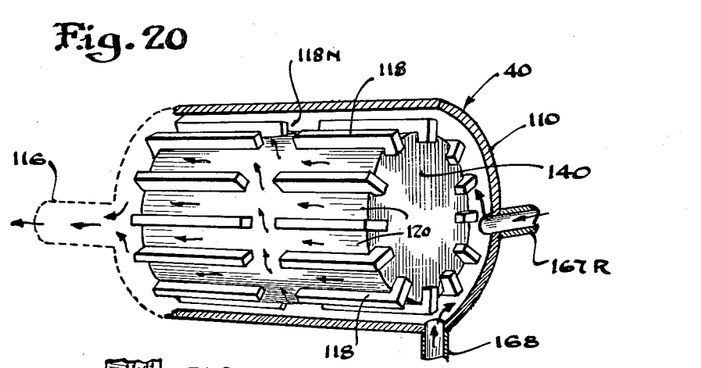
FIG. 20 is a schematic perspective view illustrating the path of material flow within the blending head.
Figures 21, 22, 23:
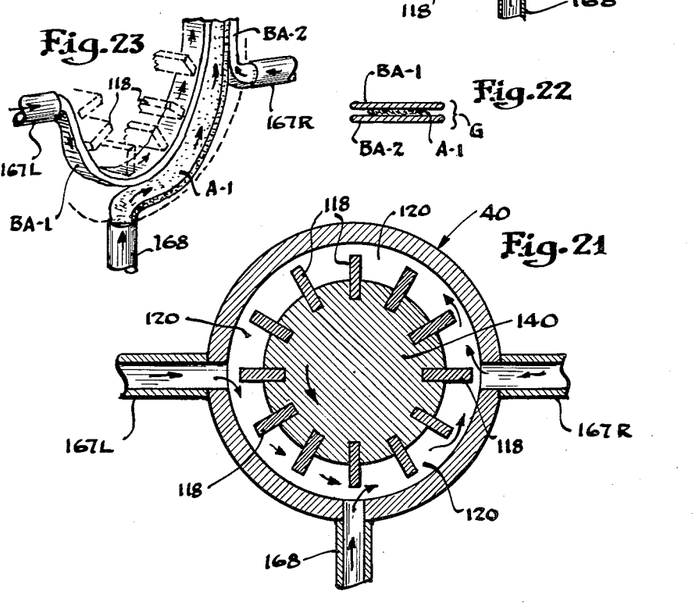
FIG. 21 is a transverse cross-sectional view of the blending head illustrating other aspects of the material flowing within the blending head.
FIG. 22 is a schematic view illustrating the way in which successive layers of two different materials that are to be blended are deposited within the blending head.
FIG. 23 is a further schematic view illustrating the way in which the successive layers of material are deposited in the blending head.

The blender 40 is shown in detail in FIGS. 17 to 19 of the drawings, and its operation is schematically illustrated in FIGS. 20 to 22 of the drawings. As shown in FIGS. 17 to 19, the blender has a cylindrical casing 110 in which the rotor 140 is mounted for rotation, and the blender casing 110 is mounted on the column 42 so that the rotor 140 is substantially aligned with and adjacent to the drive shaft 44. In the end of the cylindrical casing 110 that is adjacent to the drive shaft 44, a relatively large bearing 111 is mounted in fixed position and in this bearing a stub shaft 112 is mounted. The stub shaft 112 has an O ring sealing arrangement 112S, and at its inner end has an enlarged flange or head 112H that is located in a complemental socket formed on the inner end of the bearing 111 so that the head 112 has a thrust engagement with such rabbeted groove. At its outer end the stub shaft 112 has a slot and blade driving connection 113 with the shaft 44, while at its inner end the shaft 112 has a blade and slot driving connection 114 with the rotor 140.

At the other or output end of the casing 110, an end wall 115 is extended across the casing and is secured thereto by cap screws 115C that extend through the end wall 115 and are threaded through a flange 110F that is rigid with the cylindrical casing 110. Axially of the end wall 115, an extending discharge sleeve 116 is positioned so that materials fed to and blended by the blender are discharged through this axial sleeve at what may be termed the output end of the blender.

The rotor 140 comprises a cylindrical member of a diameter substantially less than the cylindrical casing 110, and about the cylindrical surface of the rotor 140, a series of longitudinally extending transversely spaced blades 118 are mounted. These blades are mounted by a press fit in longitudinal slots that are formed in the cylindrical body of the rotor 140, and it will be observed that the blades 118 are of such a length that they extend from the end wall 115 to the bearing 111 that forms the other end wall of the casing, there being, of course, a slight clearance between the ends of the blades 118 and the end walls. In contrast to this, the cylindrical body of the rotor 140 is somewhat shorter than the blades 118, and the blades 118 are so located in a longitudinal sense in the cylindrical body of the rotor 140 that an end clearance space 119, FIG. 18, is provided between the end wall 115 and the adjacent end of the rotor 140. This end clearance space 119 provides for travel of the material longitudinally through the blending head 40, then radially inwardly through the space 119 and then out of the axial discharge passage 116, as will be described in greater detail hereinafter.

The rotor 140 has the blades 118 mounted therein so that there is but a slight clearance between the edges of these blades 118 and the internal cylindrical surface of the casing 110, the clearance that has been adopted in the present machine being in the order of .002 inch. Such close fit of the blades 118 in respect to the inside surface of the casing 110 gives the blades a sufficient cutting action to keep the inside surface of the casing clear of semi-cured material.

The precise clearance between the outer cylindrical surface of the body of the rotor 140 and the inner cylindrical surface of the casing 110 may vary considerably, but as an example it may be pointed out that with an internal casing diameter of 1⅜", a rotor diameter of approximately 1¹⁄₁₆" has been employed, thereby providing a spacing of approximately ⁵⁄₃₂" between the cylindrical surface of the rotor 140 and the inside of the casing 110. With this arrangement the spaces between the several blades 118 constitute longitudinally extending pockets or passages 120 in which material that is being blended is confined and rotated with the rotor 140, and along which such material must move longitudinally as more material is introduced under pressure into the nlet end of the blender.

For purposes that will become apparent hereinafter, each of the blades 118 is formed with a notch 118N therein and this notch is located substantially midway between the ends of the blades. These notches produce a crossflow of the material from one of the channels 120 to the next in the course of the passage of such material through the blending head, and this has been found to increase the blending efficiency of the unit.

Such introduction of the individual materials that are to be blended is accomplished under pressure by the metering pumps 35 and 36, and the rate of such introduction of each of the materials is governed by the metering output of such pump. As pointed out hereinbefore, the accelerator is fed to the blender through a pipe 68 which is connected to the blender 40 by an inlet pipe 168 that is located at the input end of the blender, which is to say, at the end that is remote from the outlet 116. The inlet pipe 168 discharges radially into the casing 110 through an appropriate opening in this casing.

The base material is of course, fed to the blender 40 through the pipe 67, and where such material is to be introduced at more than one point into the blender 40, branch pipes are provided from the pipe 67. Thus in the present instance where two points of introduction of the base material are to be employed, the branch pipes 67L and 67R are connected respectively to inlet pipes 167L and 167R that are connected radially to the casing 110 at the inlet end and are spaced 90° in opposite directions from the inlet pipe 168.

With the structure that is thus provided, the rate of introduction of the material through the various inlets is coordinated with the rotative speed of the rotor 140 in such a way that the discharge from each of the inlets is in the form of a narrow and extremely thin ribbon of the material that is being fed, and with the inlets for the respective materials arranged in the manner shown, each ribbon of base material that is in effect laid upon the rotor 140, is in contact with a thin ribbon of accelerator, and in this way there is a preliminary proportional distribution of the two materials which accomplishes a large part of the required intermixture or blending of such materials.

The ribbons of materials that are thus laid successively upon the outer surface of the previously injected materials are exceedingly thin, and in some instances may be but little thicker than the clearance between the blades 118 and the casing. This dimension of the ribbons of materials that are thus discharged into the blending head may vary quite widely depending upon the rate of material supply and upon the rate of circumferential movement of the outer edges of the blades 118. In any event, each such ribbon of material is so thin that it may be compared quite closely with the thickness of a sheet of ordinary bond paper.

These thin layers of ribbons of material that are thus forced into the blender 40 at the inlet end thereof may be said to be arranged in groups of layers as illustrated diagrammatically in FIG. 22 where a group G of such layers is illustrated consisting of a layer BA-1 of base material, a layer A-1 of accelerator and a third layer BA-2 of base material. The manner in which these layers are discharged from the inlet opening is illustrated diagrammatically in FIG. 23 of the drawings, and bearing in mind the extreme thinness of each of these layers of material, it will be evident that as to each group G of layers or ribbons of material, the layer A-1 of accelerator is quite intimately and proportionally related to the ribbons BA-1 and BA-2 of base material as the several ribbons of material are forced into the blender 40.

In order to visualize the blending action that takes place within the blender 40, it must be assumed that the blender is completely filled with material. When this condition has been established, the further feeding of the materials into the inlet end of the blender forces the added ribbons of materials into the peripheral surface of the previously injected material, and this forcing action necessarily forms these successive ribbons of material as a continuous ribbon about the body of material that is opposite the inlet openings. As this additional material is forced into the blender, there is necessarily an inward compression of the original material that is opposite the inlet openings, and this in turn causes an advancing movement of all of the material within the blender endwise of the passages 120 and toward the outlet 116.

As to each revolution of the blending head 140 however, it must be kept in mind that this forward feeding action is relatively slight, and while the exact nature of the movements of the material within the passages 120 cannot be ascertained, the fact that the injection of the material is in a radial direction, coupled with the fact that the only possible path of movement of the previously injected material is in an endwise direction toward the outlet 116, it necessarily follows that there is a substantial kneading action, at least in the portions of the passages 120 adjacent to the inlet end of the blender. The radially inward compressing action that is applied to the material opposite the inlets necessarily tends to further reduce the thickness of the previously applied layers of material, thus to more intimately associate the individual particles of the substances being blended, and as this is done the endwise advancing movement of the material is initiated. Since the endwise advancing movement of the material is gradual and is attained at the relatively high feeding pressure, the properly proportioned elements that have originally made up the group G of layers are effectively forced into more intimate contact with each other as they move under pressure along their tortuous path toward the outlet of the blender.

When the material has been forced endwise along the passages 120 to a location near the notches 118N that are formed in the plates 118, it is found that there is a drag exerted on the material by the wall 110 of the blender housing so that in this portion of the blender, there is a cross flow of the material in a generally circumferential direction with respect to the blending head 140. As a result of this substantial cross flow, portions of material that have started their endwise movement in one of the passages 120 will at this intermediate point of the blender head be shifted so as to complete their endwise movement along another one or more of the passages 120. The clearance spaces between the edges of the blades 118 and the internal surface of the housing 110 also provide further paths of a different character for cross flow of material between the several passages 120, so that the path of travel for the material is quite complex and tortuous as it progresses from the inlet to the outlet of the blender. When the material has reached the space 119 at the outlet end of the blender, it must flow toward the axis of the rotor 140 through the space 119 and then axially out of the discharge 116, and in such inward flow, after the material passes the inner edges of the blades 118, there is a marked reduction in the rotative forces applied to the material, with the result that the material being discharged inwardly from the spaces 120 is in effect spread upon and about the body of material closer to the axis of the outlet. Thus, any further blending that is required is completed as the material moves inwardly toward the discharge opening.

*Operation*

When the blender is to be operated to accomplish continuous proportional blending of particular substances to produce a desired end product, the proportioning of the substances is established by appropriate adjustment of the metering pumps 35 and 36.

The output rate of the machine is of course, controlled by the combined outputs of the two metering pumps 35 and 36, and to a limited extent the output of the machine may be varied by changing or setting the output of the pumps 35 and 36 to different proportional values as the proportioning of the materials is being adjusted. Otherwise, the drive speed may be varied by the use of a variable speed motor or by use of a different ratio speed reducer 37.

In setting the machine for a particular blending operation, it is often desirable to vary or change the speed of rotation of the blender 40, and this is done in accordance with the characteristics of the materials that are to be blended. Thus, in some instances, the materials that are to be blended are so related as to produce heat by chemical reaction, and in such instances a relatively slow speed of the blender may be utilized so as to thereby reduce the amount of mechanically produced heat during the blending operation. In other instances where there is no heat produced by chemical reaction in the materials that are being blended, higher speeds may be employed in the blender 40. Such changes in speed of the blender 40 are accomplished by substitution of different size pulleys in the belt and pulley drive 44. With the present machine in the size hereinbefore mentioned, the output of the blender has been varied between ½ gallon per hour to 1 gallon per hour, while the rotor speeds in the blender have been varied between 100 and 300 r.p.m. It will be apparent, however, that the output may be varied by changes in the size of the blender.

After the output rate, and the proportioning of the blender speeds have been established, the tanks 33 and 34 are filled. The filling of the accelerator tank 34 is relatively simple and involves merely the unclamping and removal of the cap plate 34C. After the accelerator tank 34 has been filled, the cap 34C is replaced and clamped in place.

With respect to the base compound tank 33, the filling operation is performed by removing the cap 133C and placing the funnel 73 in position on the filling pipe 74. The funnel 73 is rotated to such a position that the valve afforded by the plates 33P and 73P is closed, and the viscous base compound is then poured into the funnel so as to afford a supply to be discharged into the tank 33.

The filling switch 60-2 is then closed so as to set the valves 51 and 54 in their actuated relation wherein the compressor 46 acts as a vacuum pump. The compressor 46 is then started and the air from within the tank 33 is exhausted. The vacuum within the tank 33 is carried to the desired point, such for example, 20 millimeters of mercury as indicated on the gauge 53G, and the flow of material from the funnel 73 into the tank 33 is then initiated by rotating the funnel so as to open the valve that is afforded by the plates 73P and 33P. The extent of such valve opening may be varied so that a gradual flow of material into the filler pipe 74 is attained. Such material flow is downwardly into the pipe 74 and through the trap that is carried by the lower end of this pipe, and as the material is discharged from the trap, any air that may have been entrained in the material is withdrawn by the suction action of the compressor 46. When the supply of materials in the funnel 73 needs to be replenished, the flow may be cutoff by rotation of the funnel to a valve-closing position. When the tank 33 has been filled to the desired extent, the cap plate 133C is replaced and clamped in position.

The blending machine 30 is then in condition for blending operation, and the switch 60-2 is opened and normal operation of the compressor 46 is initiated. This builds up pressure in the tank 33 and 34 so that the materials may be fed therefrom under substantial pressure to the metering pumps 35 and 36. The metering pumps 35 and 36 are then started and operation or rotation of the blender 40 is started.

In starting the operation of the machine care should be taken that a shut-off valve 66V located in the accelerator line 66 is fully opened. The materials from the two tanks will thus be fed to the blending head 40 where the blending operation takes place, as hereinbefore described, and the blended material is discharged in a uniform rate from the output 16 of the blender.

When the blending operation is to be discontinued for a short time, as during a lunch period, the operation of the various units may merely be shut-down for the required time, and this is possible because the heat that is produced is so slight that the material will not set up to any appreciable extent during a short shut-down period.

When the machine is to be shutdown for an appreciable time, as at the end of a day, the present machine is so arranged that it requires practically no work or labor in cleaning of the parts which would otherwise be required in order to prevent set up of the material. Thus, when the machine is to be shut-down for the night, it is only necessary to close the valve 66V in the feed path of the accelerator while at the same time continuing operation of the proportioning pumps and the blender 40. When this is done, the machine continues to feed base material into the blending head, and this additionally fed base material acts to force the previously supplied blend of base material and accelerator onwardly through the blender. Thus, after a short period of such operation of the machine, the base material acts to remove all of the accelerator from within the blending head, and the blending head is filled with base material only. This pure base material, of course, will not set up in the absence of accelerator, and hence, the machine may then be allowed to set overnight or for longer periods without adverse effects. When the machine is again started, the valve 66V is opened, and after discharge of the pure base material from the blending head by the feeding of additional material into the blending head, the output of the blender will then be the desired blended product.

While the blender illustrated and described herein is adapted to blend but two ingredients, it is to be understood that additional supply and metering units may be used when it is desired to blend a greater number of ingredients.

*Conclusion*

From the foregoing description it will be apparent that the present invention greatly simplifies the blending of flowable materials, and that such simplification finds particular utility in the blending of the ingredients of synthetic rubbers and the like. It will be also evident that the present invention enables such blending to be accomplished continuously and with such efficiency that production of objectionable heat in the material is avoided.

It will also be evident that under the present invention, materials such as the ingredients of synthetic rubber are blended continuously and under pressure in such a way that these ingredients are initially proportioned with respect to each other and are introduced into the apparatus continuously and in the required proportion, and that such introduction is carried out in such a way that the ingredients are in intimate contact with each other in proper proportions at the time of such introduction of the materials into the blending means. It will also be apparent that after such introduction in the desired proportion and intimate relation, the final blending operation is carried out primarily by a kneading of the materials under pressure within the blending means, and this kneading takes place while the material flows at a relatively slow rate under pressure so that the tendency to produce heat in the blending operation is minimized.

Thus while I have illustrated and described a preferred embodiment of my invention it is to be understood that changes and variations may be made by those skilled in the art without departing from the spirit and scope of the appended claims.

I claim:

1. In a machine for blending the components of a rubber-like composition, independent tanks for containing supplies of the component materials, metering means for the respective components connected to said component supply tanks, a blending unit to which said components are fed by said metering means for blending, an air compressor connected to at least one of said supply tanks for applying feeding pressure to the material contained therein, and means for reversing the connections of said compressor to said one of said supply tanks whereby said one of said supply tanks may be loaded under vacuum conditions.

2. In a blender, a cylindrical casing having radial inlets at one end and an axial outlet at the other end, a rotor in said casing, said rotor having longitudinal blades in spaced relation about its outer surface, and means for feeding flowable materials to be blended along independent supply paths to the respective inlets under pressure and at proportional flow rates corresponding to the combining ratio desired to discharge the material from each outlet individually as a thin layer on the opposed periphery of the material previously fed into the casing so that the respective materials build up opposite the inlets as a succession of thin superposed layers in surface contact with each other and by their pressure induce flow of the previously introduced materials toward said outlet.

3. A blender of the character described comprising a cylindrical casing having radial inlets at one end and an axial outlet at the other end, a rotor disposed in said casing with the end thereof adjacent said outlet spaced from said outlet to provide clearance space through which material may flow to said outlet, and a plurality of longitudinal blades fixed in said rotor and extending beyond said end of the rotor so as to be disposed in part in the outer portion of said clearance space.

4. In a blender, a cylindrical casing having radial inlets at one end and an axial outlet at the other end, a rotor in said casing, said rotor having longitudinal blades in spaced relation about its outer surfaces, said rotor having the end thereof adjacent said outlet spaced from said outlet to provide clearance space through which material may flow to said outlet, and said blades having notches formed in the outer edges thereof through which material may move circumferentially of said rotor.

5. In a blender for flowable materials, a cylindrical casing having radial inlets at one end and an outlet at the other end, a rotor in said casing, said rotor having longitudinal blades in spaced relation about its outer surface, and at least certain of said blades having notches formed in the outer edges thereof through which material may flow circumferentially of said rotor.

6. In a blender, a housing having a cylindrical side wall and first and second end walls, a drive shaft extended through said first end wall, means defining an axial outlet in said second end wall, a rotor in said housing driven rotatively by said shaft, said rotor having longitudinal blades in spaced relation about its outer surface to define longitudinal passages between said blades along the outer surface of the rotor, means for feeding flowable materials to be blended along independent supply paths under pressure and at proportional flow rates corresponding to the combining ratio desired, and inlet ports connected to the respective paths and opening radially into said housing through said cylindrical wall and adjacent said first end wall to discharge the respective materials individually in the layers covering previously introduced material opposite said ports and building up as a succession of thin superposed layers in surface contact with each other.

References Cited in the file of this patent

UNITED STATES PATENTS

| | | |
|---|---|---|
| 587,635 | Bach | Aug. 3, 1897 |
| 886,768 | De Bogory | May 5, 1908 |
| 1,305,754 | Tate et al. | June 3, 1919 |
| 1,869,833 | Williams | Aug. 2, 1932 |
| 1,881,994 | Banbury | Oct. 11, 1932 |
| 2,077,226 | De Bethune | Apr. 13, 1937 |
| 2,146,532 | Crane et al. | Feb. 7, 1939 |
| 2,504,945 | Austin et al. | Apr. 18, 1950 |
| 2,561,810 | McCombie | July 24, 1951 |
| 2,627,394 | Spencer | Feb. 3, 1953 |
| 2,696,937 | Johnson et al. | Dec. 14, 1954 |
| 2,763,896 | Vogt | Sept. 25, 1956 |
| 2,768,405 | Mineah | Oct. 30, 1956 |
| 2,779,054 | Doriat et al. | Jan. 29, 1957 |
| 2,780,247 | Claassen | Feb. 5, 1957 |
| 2,783,786 | Carter | Mar. 5, 1957 |
| 2,814,827 | Snow et al. | Dec. 3, 1957 |
| 2,863,649 | Grubb et al. | Dec. 9, 1958 |